United States Patent
Lee et al.

(10) Patent No.: US 12,340,235 B2
(45) Date of Patent: Jun. 24, 2025

(54) ELECTRONIC DEVICE AND CONTROL METHOD THEREOF

(71) Applicant: SAMSUNG ELECTRONICS CO., LTD., Suwon-si (KR)

(72) Inventors: Jungwoo Lee, Suwon-si (KR); Jongmin Kim, Suwon-si (KR); Backki Kim, Suwon-si (KR)

(73) Assignee: SAMSUNG ELECTRONICS CO., LTD, Suwon-si (KR)

( * ) Notice: Subject to any disclaimer, the term of this patent is extended or adjusted under 35 U.S.C. 154(b) by 100 days.

(21) Appl. No.: 18/116,583

(22) Filed: Mar. 2, 2023

(65) Prior Publication Data

US 2023/0205554 A1    Jun. 29, 2023

Related U.S. Application Data

(63) Continuation of application No. PCT/KR2021/010164, filed on Aug. 3, 2021.

(30) Foreign Application Priority Data

Sep. 2, 2020    (KR) .................... 10-2020-0111838

(51) Int. Cl.
    *G06F 9/451*        (2018.01)
    *G06F 8/41*         (2018.01)
    (Continued)

(52) U.S. Cl.
    CPC ............. *G06F 9/451* (2018.02); *G06F 8/41* (2013.01); *H04N 21/431* (2013.01); *H04N 21/8173* (2013.01)

(58) Field of Classification Search
    USPC ...................................... 717/140
    See application file for complete search history.

(56) References Cited

U.S. PATENT DOCUMENTS

| | | | |
|---|---|---|---|
| 8,255,545 B1 * | 8/2012 | Schmidt ............. | H04L 67/1095 709/227 |
| 2009/0217306 A1 * | 8/2009 | Wusthoff ............ | G06F 9/44521 719/321 |

(Continued)

FOREIGN PATENT DOCUMENTS

| CN | 107273142 A | 10/2017 |
|---|---|---|
| CN | 111381978 A | 7/2020 |

(Continued)

OTHER PUBLICATIONS

"Developing Custom Gradle Plugins"; Gradle.org website [full URL included in ref.] as captured by the Wayback Machine Internet Archive (web.archive.org) on Nov. 28, 2020 (Year: 2020).*

(Continued)

*Primary Examiner* — Qing Chen
*Assistant Examiner* — Clint Thatcher
(74) *Attorney, Agent, or Firm* — STAAS & HALSEY LLP

(57) ABSTRACT

An electronic apparatus including a display; a storage; and a processor. The processor is configured to control the storage to store codes of a first application including codes related to execution of a second application that are compiled before a request to execute the first application is received, based on the request to execute the first application being received. The processor is configured to execute the codes of the first application and the compiled codes related to the second application, and control the display to display a first menu item of the first application and a second menu item of the second application.

9 Claims, 12 Drawing Sheets

(51) Int. Cl.
*H04N 21/431* (2011.01)
*H04N 21/81* (2011.01)

(56) References Cited

U.S. PATENT DOCUMENTS

| | | |
|---|---|---|
| 2009/0259828 A1 | 10/2009 | Grover et al. |
| 2012/0079007 A1* | 3/2012 | Brown ................... H04L 51/08 |
| | | 709/206 |
| 2012/0079043 A1* | 3/2012 | Brown ................... H04L 67/04 |
| | | 709/217 |
| 2012/0174021 A1 | 7/2012 | Dharawat |
| 2014/0282471 A1 | 9/2014 | Chaney et al. |
| 2015/0193209 A1* | 7/2015 | Carter ....................... G06F 8/30 |
| | | 717/109 |
| 2015/0347749 A1 | 12/2015 | Kiehtreiber et al. |
| 2017/0017531 A1* | 1/2017 | Choi ....................... G06F 9/468 |
| 2017/0220208 A1* | 8/2017 | Choi ................ H04N 21/41415 |
| 2018/0217736 A1* | 8/2018 | Nam ................... G06F 3/04883 |
| 2018/0293085 A1* | 10/2018 | Li ............................... G06F 8/41 |
| 2019/0087211 A1 | 3/2019 | Wang et al. |
| 2019/0102244 A1 | 4/2019 | Tarlano et al. |
| 2019/0235883 A1 | 8/2019 | Chaney et al. |
| 2019/0317887 A1 | 10/2019 | Wiener et al. |
| 2021/0326146 A1* | 10/2021 | Sharma ............... G06F 9/45558 |

FOREIGN PATENT DOCUMENTS

| | | |
|---|---|---|
| JP | 5152594 | 12/2012 |
| KR | 10-2013-0086138 A | 7/2013 |
| KR | 10-2013-0101122 | 9/2013 |
| KR | 10-2013-0135159 A | 12/2013 |
| KR | 10-2016-0147862 A | 12/2016 |
| KR | 10-2017-0094136 A | 8/2017 |
| WO | WO 2011/130651 A1 | 10/2011 |
| WO | WO 2015/183456 A1 | 12/2015 |
| WO | WO 2016/090554 A1 | 6/2016 |

OTHER PUBLICATIONS

International Search Report issued in International Application No. PCT/KR2021/010164 dated Nov. 18, 2021.
Detailed Grounds for Rejection issued Feb. 21, 2025 for Application No. 10-2020-0111838.

* cited by examiner

ELECTRONIC DEVICE AND CONTROL METHOD THEREOF

CROSS-REFERENCE TO RELATED THE APPLICATION(s)

This application is a continuation application, under 35 U.S.C. § 111(a), of International Patent Application No. PCT/KR2021/010164, filed on Aug. 3, 2021, which is based on and claims priority to Korean Patent Application No. 10-2020-0111838 filed on Sep. 2, 2020 in the Korean Intellectual Property Office, the disclosures of which are incorporated by reference herein in their entirety.

BACKGROUND

Field

The disclosure relates to an electronic apparatus and a method of controlling the same, and more particularly to an electronic apparatus and a method of controlling the same, in which a plug-in application is dynamically loaded.

Description of Related Art

A plug-in architecture refers to a software design technique that enables the function of a main application to be extended through a plug-in application. Based on such extensibility, the plug-in architecture has been widely applied to systems, applications, etc. required to have additional functions.

To use the function of the plug-in application, the main application employs a plug-in module. In the case of a TV, the TV loads the plug-in module while executing the main application, and performs compiling based on the loaded plug-in module. The plug-in module enables data communication between the main application and the plug-in application, and therefore the TV controls the plug-in application to be executed according to a compiled code based on the plug-in module loaded during the execution of the main application. In other words, the TV may use the function of the plug-in application.

However, because the plug-in module is loaded during the execution of the main application and the code is compiled based on this loaded plug-in module, the execution speed of the main application is slowed down. Despite the foregoing excellent extensibility of the plug-in architecture, the slow-down in the execution speed causes the utilization of the plug-in architecture to be decreased.

Accordingly, there is an urgent need for a method of improving the utilization of the plug-in architecture along with the extensibility by raising the execution speed of the main application when the plug-in architecture is implemented.

SUMMARY

According to an embodiment of the disclosure, an electronic apparatus comprises: a display; a storage; and a processor. The processor is configured to: control the storage to store codes of a first application including codes related to execution of a second application that are compiled before a request to execute the first application is received, based on the request to execute the first application being received, execute the codes of the first application and the compiled codes related to the second application, and control the display to display a first menu item of the first application and a second menu item of the second application.

According to an embodiment of the disclosure, an electronic apparatus comprises: a first storage configured to store codes of a first application; a second storage; and a processor configured to: execute the first application by loading the codes of the first application, stored in the first storage, into the second storage, and control execution of a second application based on a code, related to the execution of the second application, among the codes of the first application during the execution of the first application, wherein the code related to the execution of the second application among the codes of the first application stored in the first storage comprises a code compiled based on meta information of the second application.

According to an embodiment, the processor is configured to: display an item of the second application on a display by executing the code of the first application loaded into the second storage, and control the execution of the second application based on the item selected by a user's input.

According to an embodiment, compiled codes of the first application comprises a first codes, the processor is configured to: start the execution of the first application based on second codes of the first application which are uncompiled; loading the meta information of the second application based on the second codes; compile the code related to the execution of the second application among the second codes based on the loaded meta information; and obtain the first codes by compiling the second codes comprising the compiled codes related to the execution of the second application.

The processor is configured to: add a third application different from the second application as a new application so that execution of the third application is controlable during the execution of the first application; and update the code of the first application based on meta information of the added third application.

Further comprising an interface, wherein the processor is configured to control the interface so that reference information to obtain the meta information of the third application is transmittable to a server.

The processor is configured to receive the code of the first application updated based on the meta information of the third application from the server.

According to another embodiment of the disclosure, an electronic apparatus comprises: an interface configured to connect with an external apparatus; and a processor configured to: start executing a first application based on first codes of the first application, the first codes being uncompiled, load meta information of a second application based on the first codes, store second codes of the first application, the second codes being obtained by compiling the first codes based on the loaded meta information, and control the stored second codes of the first application to be transmitted to the external apparatus that is connected to the electronic apparatus through the interface, wherein based on a request for execution of the first application being received, the second codes of the first application, which are transmitted to the external apparatus, enable execution of the second codes of the first application and the compiled codes related to execution of the second application by the external apparatus so that a first menu item of the first application and a second menu item of the second application are displayed.

The processor is configured to: receive reference information about the meta information of the second application from the external apparatus, and load the meta information of the second application based on the received reference information.

The processor is configured to: identify a code for loading the meta information of the second application, the code for loading being identified as being included in the first codes, or a section of a corresponding code among the first codes, based on the reference information, and replace the identified code or the identified section with a compiled code or a code section, based on the meta information of the second application.

The processor is configured to: update the second code of the first application based on meta information of a third application so that execution of the third application is controlable and the third application is added as a new application during the execution of the first application; and control the interface to transmit the updated second code of the first application to the external apparatus.

DETAILED DESCRIPTION

Figure 1:
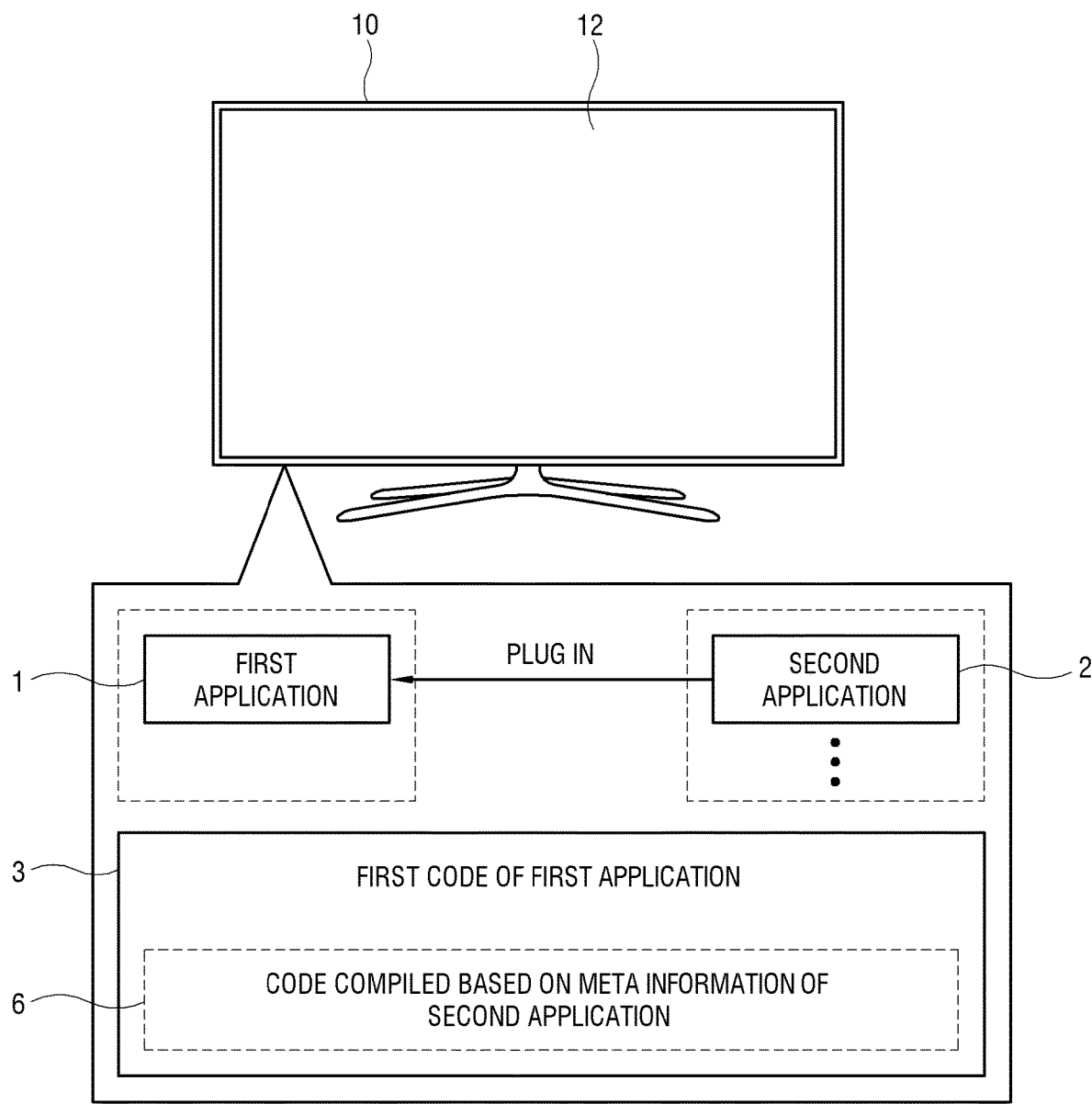
FIG. 1 illustrates an electronic apparatus according to an embodiment of the disclosure.

Below, embodiments of the disclosure will be described in detail with reference to accompanying drawings. In the description of the following embodiments, elements illustrated in the accompanying drawings will be referenced, and like numerals or symbols set forth in the drawings refer to like elements having substantially the same operations. In the disclosure, at least one among a plurality of elements refers to not only all the plurality of elements but also both each one of the plurality of elements excluding the other elements and a combination thereof.

An aspect of the disclosure is to provide an electronic apparatus and a method of controlling the same, in which a plug-in architecture is improved utilization along with extensibility by raising an execution speed of a main application when the plug-in architecture is implemented.

According to the disclosure, there are provided an electronic apparatus and a method of controlling the same, in which a plug-in architecture is improved in utilization along with extensibility by raising an execution speed of a main application when the plug-in architecture is implemented.

FIG. 1 illustrates an electronic apparatus according to an embodiment of the disclosure.

As shown in FIG. 1, an electronic apparatus 10 may be implemented by various types of apparatuses, such as a set-top box having no display, and the like image processing apparatuses; a refrigerator, a washing machine, and the like home appliances; a computer and the like information processing apparatuses; as well as a TV, a tablet PC, a portable media player, a wearable device, a video wall, an electronic picture frame, and the like image display apparatuses. Further, the electronic apparatus 10 may be implemented by an artificial intelligence (AI) loudspeaker with an AI function, an AI robot, etc. However, for convenience of description, it will be assumed that the TV is implemented as the electronic apparatus 10, but there are no limits to the type of the electronic apparatus 10.

The electronic apparatus 10 provides a plug-in architecture. The plug-in architecture refers to a software design technique for extending a function of a first application by utilizing a function of a second application 2 plugged in the first application 1. Here, the first application 1 refers to a core or main application that performs a host function, and the second application 2 includes a plug-in application plugged in the core or main application and providing an additional function to the host function. For example, when the first application 1 provides a moving-picture providing function, the first application 1 may use a file extension function of the second application 2 to process and provide various formats of moving picture files. Alternatively, when the first application 1 provides an e-mail function, the first application 1 may use a security function of the second application 2 to encrypt an e-mail. The first application 1 may provide not only functions extended from the moving-picture providing function and the email function, but also functions extended from a software development function, a menu display function, etc.

A plurality of first applications 1 may be provided corresponding to functions, and a plurality of second application 2 may be provided and plugged in for each first application 1. However, for convenience of description, it will be assumed that one second application 2 is plugged in one first application 1, and the execution of the second application 2 is controlled while executing the first application 1.

The electronic apparatus 10 executes the first application 1 based on a first code 3 of the first application 1. The first code 3 may be provided before the execution of the first application 1. The electronic apparatus 10 controls the execution of the second application 2 based on a code related to the execution of the second application 2 included in the first code 3 of the first application while executing the first application 1, thereby utilizing the function of the second application 2.

The code related to the execution of the second application 2, which is included in the first code 3 of the first application 1, includes a code 6 compiled based on meta information of the second application 2. The meta information refers to information for functionally connecting the first application 1 and the second application 2, and includes the class type, method, and property of the second application 2. By loading the meta information, the second application 2 may be set or added as a plug-in application to the first application 1. When the second application 2 is set or added as the plug-in application, the second application 2 receives a control instruction of the first application 1, and transmits a processing result corresponding to the received control instruction to the first application 1.

In this way, the electronic apparatus 10 executes the first application 1 based on the first code 3 provided before the execution of the first application 1, and controls the execution of the second application 2 based on the code 6 compiled based on the meta information of the second application 2, as the code related to the execution of the second application 2 included in the first code 3, thereby improving the execution speed of the first application 1 as compared with the case where the execution of the second application 2 is controlled by compiling the code while executing the first application 1.

Figure 2:
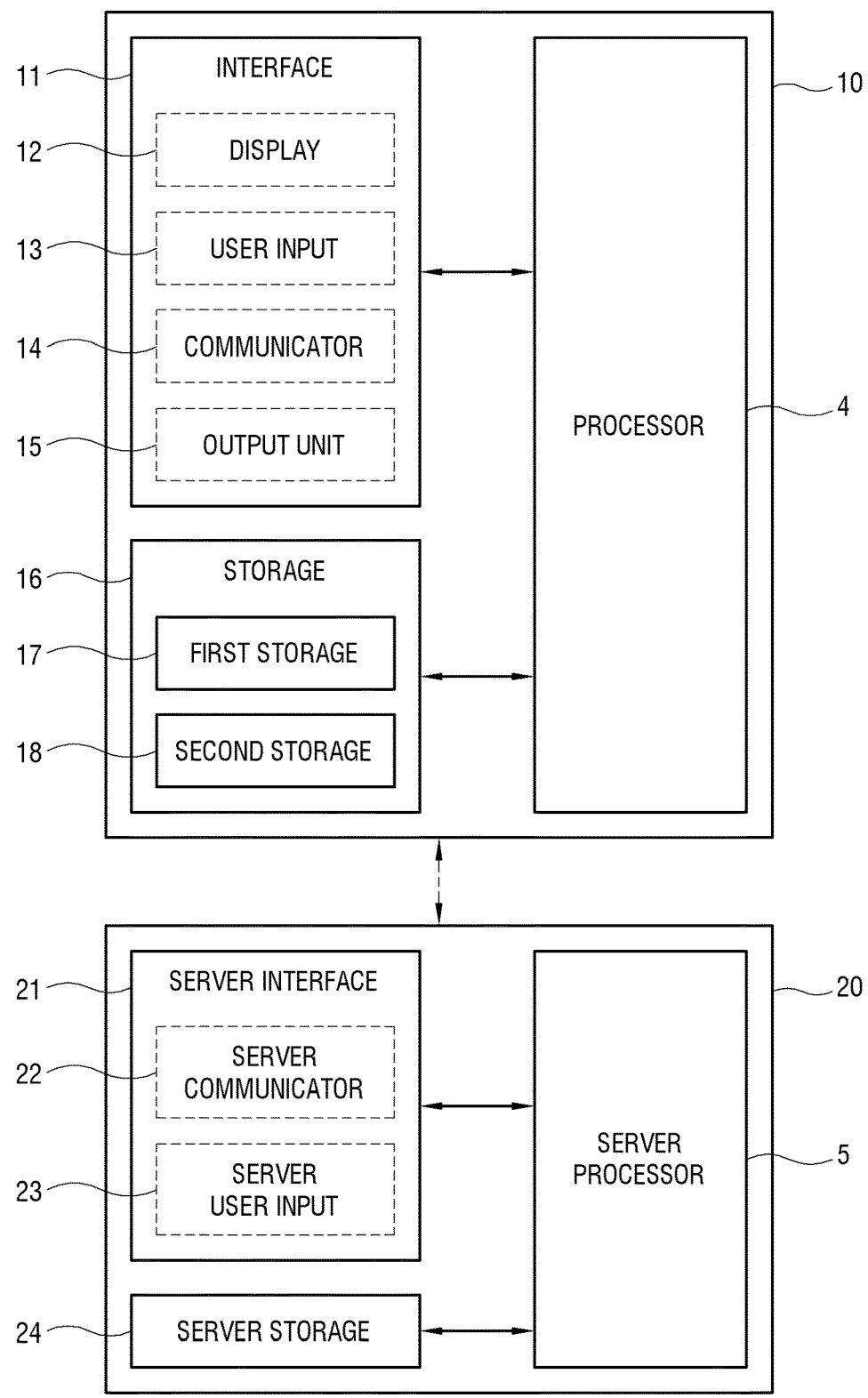
FIG. 2 illustrates a configuration of the electronic apparatus in FIG. 1 according to an embodiment of the disclosure.

FIG. 2 illustrates a configuration of the electronic apparatus of FIG. 1.

Below, the configuration of the electronic apparatus 10 will be described with reference to FIG. 2.

In this embodiment, it will be described that the electronic apparatus 10 is a TV. However, the electronic apparatus 10 may be implemented by various kinds of apparatuses, and this embodiment does not limit the configuration of the electronic apparatus 10. The electronic apparatus 10 may not be implemented by the TV or the like display apparatus, and the electronic apparatus 10 in this case may not include a display 12 and the like elements for displaying an image. For example, when the electronic apparatus 10 is implemented by the set-top box, the electronic apparatus 10 outputs an image signal to an external TV through an interface 11.

The electronic apparatus 10 includes the interface 11. The interface 11 is connected to a server 20 and transmits and receives data to and from the server 20. The interface 11 includes a wired interface. The wired interface includes a connector or port to which an antenna for receiving a broadcast signal based on terrestrial/satellite broadcasting standards and the like broadcasting standards is connected, or to which a cable for receiving a broadcast signal based on cable broadcasting standards is connected. Alternatively, the electronic apparatus 10 may include a built-in antenna for receiving a broadcast signal. The wired interface includes a connector, a port, etc. based on video and/or audio transmission standards, such as an HDMI port, DisplayPort, a DVI port, a thunderbolt, composite video, component video, super video, syndicat des constructeurs des appareils radiorécepteurs et téléviseurs (SCART). The wired interface includes a connector, a port, etc. based on universal data transmission standards, such as a universal serial bus (USB) port, etc. The wired interface includes a connector, a port, etc. to which an optical cable based on optical transmission standards is connectable. The wired interface includes a connector, a port, etc. to which an external audio receiver 3 or an external audio device with the audio receiver 3 is connected, and which receives or inputs an audio signal from the audio device. The wired interface includes a connector, a port, etc. to which a headset, an earphone, an external loudspeaker or the like audio device is connected, and which transmits or outputs an audio signal to the audio device. The wired interface includes a connector or a port based on Ethernet or the like network transmission standards. For example, the wired interface may be implemented by a local area network (LAN) card or the like connected to a router or a gateway by a wire.

The wired interface is connected to a set-top box, an optical media player or the like external apparatus or an external display apparatus, a loudspeaker, a server, etc. by a cable in a manner of one-to-one or one-to-N (where, N is a natural number) through the connector or the port, thereby receiving a video/audio signal from the corresponding external apparatus or transmitting a video/audio signal to the corresponding external apparatus. The wired interface may include connectors or ports to individually transmit video/audio signals.

The wired interface may be built-in the electronic apparatus 10, but may also be implemented in the form of a dongle or a module and detachably connected to the connector of the electronic apparatus 10.

The interface 11 includes a wireless interface. The wireless interface may be variously implemented corresponding to the type of the electronic apparatus 10. For example, the wireless interface uses wireless communication based on radio frequency (RF), Zigbee, Bluetooth, Wi-Fi, ultra wideband (UWB), near field communication (NFC) etc. The wireless interface may be implemented by a wireless communication module that performs wireless communication with an access point (AP) based on Wi-Fi, a wireless communication module that performs one-to-one direct wireless communication such as Bluetooth, etc. The wireless interface wirelessly communicates with other servers on a network to thereby transmit and receive a data packet to and from at least one server 20. The wireless interface includes an infrared (IR) transmitter and/or an IR receiver to transmit and/or receive an IR signal based on IR communication standards. The wireless interface receives or inputs a remote-control signal from a remote controller or other external devices, or transmits or outputs the remote-control signal to other external devices through the IR transmitter and/or IR receiver. Alternatively, the electronic apparatus 10 may transmit and receive the remote-control signal to and from the remote controller or other external devices through the wireless interface 112 based on Wi-Fi, Bluetooth or the like other standards.

The electronic apparatus 10 may further include a tuner to be tuned to channels for a broadcast signal, when the broadcast signal is a video/audio signal received through the interface 11.

The electronic apparatus 10 includes the display 12. The display 12 includes a display panel capable of displaying an image on a screen thereof. The display panel may have a light receiving structure like a liquid crystal display (LCD) type, or a self-emissive structure like an organic light emitting diode (OLED) type. The display 12 may include an additional element according to the structures of the display panel. For example, when the display panel is of the LCD type, the display 12 includes an LCD panel, a backlight unit for illuminating the LCD panel, and a panel driving substrate for driving liquid crystal of the LCD panel. However, the display 12 may be excluded when the electronic apparatus 10 is implemented by a set-top box or the like.

The electronic apparatus 10 includes a user input 13. The user input 13 includes various types of input interface-related circuits provided to be controlled by a user and allowing the user to make an input. The user input 13 may be configured in various forms according to the types of the electronic apparatus 10, and may for example include mechanical or electronic buttons of the electronic apparatus 10, a touch pad, a touch screen installed on the display 12, etc.

The electronic apparatus 10 includes a communicator 14. The communicator 14 may be implemented as at least one communicator. The communicator 14 includes a first communicator to communicate with at least one server 20, and a second communicator to connect with external apparatuses other than the server and transmit a video/audio signal to the external apparatuses. The communicator 14 may be designed to include at least one of the wired interface or the wireless interface, and performs the function of at least one of the wired interface or the wireless interface.

The electronic apparatus 10 includes an output unit 15. When the output unit 15 is implemented by an audio output unit that outputs an sound, the output unit 15 may include at least one loudspeaker. The output unit 15 may be implemented by an internal loudspeaker provided in the electronic apparatus 10 or an external loudspeaker provided in the outside. When the output unit 15 is implemented by the external loudspeaker, the electronic apparatus 10 transmits an audio signal to the external loudspeaker through a cable or wirelessly.

A smartphone or the like may be installed with a remote control application. The smartphone or the like functions as a remote controller through the installed application, for example, controls the electronic apparatus 10. Such a remote control application may be installed in various external apparatus such as an AI loudspeaker, an AI robot, etc.

The display 12, the user input 13, the output unit 15, etc. are described as elements separate from the interface 11, but may be designed to be included in the interface 11.

The electronic apparatus 10 includes a storage 16. The storage 16 is configured to store digitized data. The storage 16 includes a first storage 17 and a second storage 18. The first storage 17 includes a nonvolatile storage in which data is retained regardless of whether power is on or off. The storage includes a flash memory, a hard-disc drive (HDD), a solid-state drive (SSD), a read only memory (ROM), etc. For example, the first application 1 and the second application 2 may be installed in the first storage 17.

The second storage 18 is loaded with data or the like to be processed by a processor 4, and includes a volatile memory in which data is retained only when power is on. The memory includes a buffer, a random-access memory, etc. For example, the second storage 18 may be loaded with the first code of the first application 1.

The electronic apparatus 10 includes the processor 4. The processor 4 includes one or more hardware processors implemented as a central processing unit (CPU), a chipset, a buffer, a circuit, etc. which are mounted onto a printed circuit board (PCB), and may be designed as a system on chip (SoC). When the electronic apparatus 10 is implemented as a display apparatus, the processor 4 includes modules corresponding to various processes, such as a demultiplexer, a decoder, a scaler, an audio digital signal processor (DSP), an amplifier, etc. Here, some or all of such modules may be implemented as an SOC. For example, the demultiplexer, the decoder, the scaler and the like video processing modules may be implemented as a video processing SOC, and the audio DSP may be implemented as a chipset separated from the SOC.

The processor 4 loads the first code 3 of the first application 1 stored in the first storage 17 into the second storage 18, and executes the first application 1 based on the loaded first code 3.

The processor 4 controls the execution of the second application 2 based on the code related to the execution of the second application included in the first code 3 of the first application 1 while executing the first application 1.

The code related to the execution of the second application 2 included in the first code 3 of the first application 1 includes the code 6 compiled based on the meta information of the second application 2.

However, the configuration of the electronic apparatus 10 is not limited to that shown in FIG. 2, but may be designed to exclude some elements from the foregoing configuration or include other elements in addition to the foregoing configuration.

Below, the configuration of the server 20 will be described in detail with reference to FIG. 2.

The server 20 includes a server interface 21. As described above, the electronic apparatus 10 and the server 20 are connected through the interface 11 and the server interface 21, and exchange the data. The server interface 21 includes a wired interface and a wireless interface. The wired interface and the wireless interface of the server interface 21 are equivalent to the wired interface and the wireless interface included in the interface 11 of the electronic apparatus 10, and thus repetitive descriptions will be avoided.

The server 20 includes a server communicator 22. The server communicator 22 may be implemented by at least one communicator. The communicator 14 includes a first communicator to communicate with at least one server 20, and a second communicator to connect with and transmit a video/audio signal to external apparatuses other than the server. The communicator 14 may be designed to include at least one of the wired interface or the wireless interface, and perform at least one function of the wired interface or the wireless interface.

The server 20 includes a server user input 23. The server user input 23 includes various types of input interface-related circuits provided to be controlled by a user and allowing the user to make an input. The server user input 23 may be configured in various forms according to the types of the server 20, and may for example include mechanical or electronic buttons of the server 20, a touch pad, etc. The server user input 23 is described as it is separate from the server interface 21, but may be designed to be included in the server interface 21.

The server 20 includes a server storage 24. The server storage 24 is configured to store digitized data. The server storage 24 includes a first server storage and a second server storage. The first server storage includes a nonvolatile storage in which data is retained regardless of whether power is on or off. The storage includes a flash memory, an HDD, an SSD, a ROM, etc. The second server storage includes a volatile memory into which data or the like to be processed by a server processor 5 is loaded, and in which data is retained only when power is on. The memory includes a buffer, a RAM, etc.

The server 20 includes the server processor 5. The server processor 5 includes one or more hardware processors implemented by a CPU, a chipset, a buffer, a circuit, etc. which are mounted onto a PCB, and may be designed as an SoC.

Below, the operations of the server processor 5 will be shortly described with reference to FIG. 3. The server processor 5 starts executing the first application 1 based on a second code 31 of the first application 1 which is not compiled.

The server processor 5 loads the meta information of the second application 2 based on the second code 31 of the first application 1.

The server processor 5 stores the first code 3 of the first application 1 including the code 6 compiled based on the loaded meta information of the second application 2.

The server processor 5 transmits the stored first code 3 of the first application 1 to the electronic apparatus 10 or the like external apparatus through the server interface 21, thereby allowing the electronic apparatus 10 to control the execution of the second application 2 based on the code related to the execution of the second application 2 included in the first code 3 of the first application 1 while executing the first application 1. In the first code 3 of the first application 1, the code related to the execution of the second application 2 includes the code compiled based on the meta information of the second application 2.

The configuration of the server 20 is not limited to that shown in FIG. 2, but may be designed to exclude some elements from the foregoing configuration or include other elements in addition to the foregoing configuration.

The processor 4 of the electronic apparatus 10 or the server processor 5 of the server 20 may employ at least one of machine learning, a neural network, or a deep learning algorithm as a rule-based or artificial intelligence (AI) model to perform at least one of data analysis, a process and result-information generation for the foregoing operations. Below, the processor 4 of the electronic apparatus 10 will be mainly described in relation to the AI operations and the like, but it will be appreciated that the server processor 5 of the server 20 may also perform the same AI operations and the like.

For example, the processor 4 functions as both a learner and a recognizer. The learner performs a function of generating the trained neural network, and the recognizer performs a function of recognizing (or inferring, predicting, estimating, judging) the data based on the trained neural network. The learner generates or updates the neural network. The learner may obtain learning data to generate the neural network. For example, the learner obtains the learning data from the storage 16 or the server storage 24 or from the outside. The learning data may be data used for the learning of the neural network, and the data subjected to the foregoing operations may be used as the learning data to train the neural network.

Before training the neural network based on the learning data, the learner performs a preprocessing operation with regard to the obtained learning data or select data to be used in learning among a plurality of pieces of the learning data. For example, the learner processes the learning data to have a preset format, apply filtering to the learning data, or process the learning data to be suitable for the learning by adding/removing noise to/from the learning data. The learner uses the preprocessed learning data for generating the neural network set to perform the operations.

The trained neural network includes a plurality of neural networks (or layers). The nodes of the plurality of neural networks have weights, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks Meanwhile, the recognizer obtains target data to perform the foregoing operations. The target data is obtained from the storage 16 or the server storage 24, or from the outside. The target data may be data targeted for recognition of the neural network. Before applying the target data to the trained neural network, the recognizer preprocesses the obtained target data or selects data to be used in the recognition among a plurality of pieces of target data. For example, the recognizer processes the target data to have a preset format, apply filtering to the target data, or add/remove noise to/from the target data, thereby processing the target data into data suitable for recognition. The recognizer applies the preprocessed target data to the neural network, thereby obtaining an output value output from the neural network. The recognizer obtains a probability value or a reliability value together with the output value.

Figure 3:
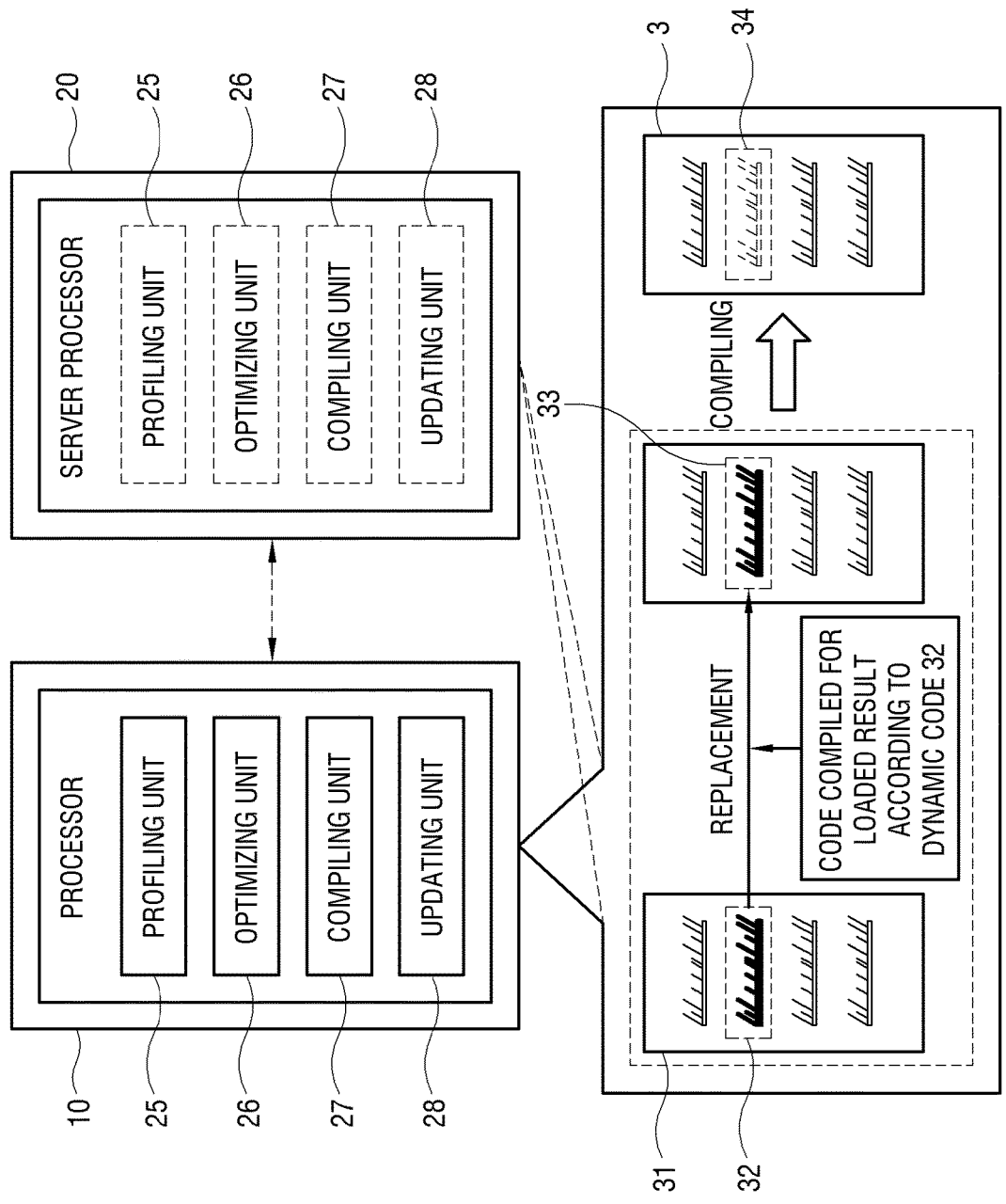
FIG. 3 illustrates configurations of a processor and a server processor in FIG. 2 according to an embodiment of the disclosure.

FIG. 3 illustrates configurations of the processor and the server processor in FIG. 2.

Below, the configurations of the processor 4 and the server processor 5 will be described in detail with reference to FIG. 3.

The processor 4 includes a profiling unit 25. The profiling unit 25 obtains information about a dynamic code 32 for dynamically loading the meta information of the second application 2 among the second codes 31 of the first application 1. The second codes 31 include a source code which is not compiled. However, the second codes 31 are not limited to such a source code, and may include a code previously, primarily, or intermediately compiled but not completely compiled yet.

The dynamic code 32 includes a code for loading the meta information of the second application 2 during the execution of the first application 1. For example, the dynamic code 32 includes a code based on runtime such as reflection. The dynamic code 32 includes not only the dynamic code 32 itself but also a code section including the dynamic code 32. However, for convenience of description, such dynamic codes will be unified and described as the dynamic code 32.

The information about the dynamic code 32 may include not only information about the dynamic code 32 itself, but also information about a location of the dynamic code 32 among the second codes 31 of the first application 1, and a location of a section where the dynamic code 32 has been used. However, the information about the dynamic code 32 is not limited to the foregoing information, and may include information about a call tree.

The processor 4 includes an optimizing unit 26. The optimizing unit 26 loads the meta information of the second application 2 according to the dynamic code 32 based on the information about the dynamic code obtained by the profiling unit 25, and obtains a result code 33 corresponding to the loaded meta information of the second application 2.

The result code 33 includes a code compiled for a result of loading the meta information of the second application 2 according to the identified dynamic code 32. However, the result code 33 is not limited to such a code, and may include a code previously, primarily, or intermediately compiled but not completely compiled yet, as a result of loading the meta information of the second application 2 according to the identified dynamic code 32. Because the second application 2 is set or added as the plug-in application according to results of loading the meta information, the result code 33 includes a code for setting or adding the second application 2 as the plug-in application.

The optimizing unit 26 changes the dynamic code 32 among the second codes 31 of the first application 1 based on the obtained result code 33. For example, the optimizing unit 26 replaces the dynamic code 32 included in the second code 31 of the first application 1 with the previously obtained result code 33.

The processor 4 includes a compiling unit 27. The compiling unit 27 compiles the second code 31 of the first application 1 including the result code 33. The compiling unit 27 prepares the first code 3 of the first application 1 by the compilation. The first code 3 includes a code 34 compiled with respect to the result code 33 corresponding to the meta information of the second application 2. When the first application 1 is executed based on the first code 3, the execution of the second application 2 is controlled based on the code 34 included in the first code 3 during the execution of the first application 1.

The processor 4 includes an updating unit 28. When the first code of the first application 1 exists, the updating unit 28 updates the existing first code of the first application 1 to correspond to the first code 3 of the first application 1 prepared in advance by the compiling unit 27. The updating unit 28 stores the first code 3 of the first application 1 in the form of an installation file. When the first code 3 of the first application 1 is updated, the execution of the second application 2 is controlled based on the code 34 included in the updated first code 3.

The server processor 5 may be designed to include at least one of the profiling unit 25, the optimizing unit 26, the compiling unit 27 or the updating unit 28, so that some operations of the processor 4 can be performed together with the server processor 5. Below, the operations of the optimizing unit 26, the compiling unit 27 and the updating unit 28 designed to be included in the server processor 5 will be described.

The server processor 5 includes the optimizing unit 26. The optimizing unit 26 receives information about the dynamic code 32 from the electronic apparatus 10. The optimizing unit 26 changes the dynamic code 32 among the second codes 31 of the first application 1 into the result code 33 based on the information about the received dynamic code 32. The result code 33 includes a code compiled for the result of loading the meta information of the second application 2 according to the dynamic code 32.

The server processor 5 includes the compiling unit 27. The compiling unit 27 prepares the first code 3 of the first application 1 by compiling the second code 31 of the first application 1 including the result code 33. The first code 3 of the first application 1 includes the code 34 compiled for the result code 33 corresponding to the meta information of the second application 2.

The server processor 5 includes the updating unit 28. The updating unit 28 updates the existing first code of the first application 1 with the previously prepared first code 3 of the first application 1. The updating unit 28 stores the first code 3 of the first application 1 in the form of the installation file, or transmits the stored first code 3 to the electronic apparatus 10.

In this way, the processor 4 performs some operations for preparing the first code 3 of the first application 1 together with the server processor 5 of the server 20, and thus resources are more efficiently managed, thereby improving the execution speed of the first application 1.

Figure 4:
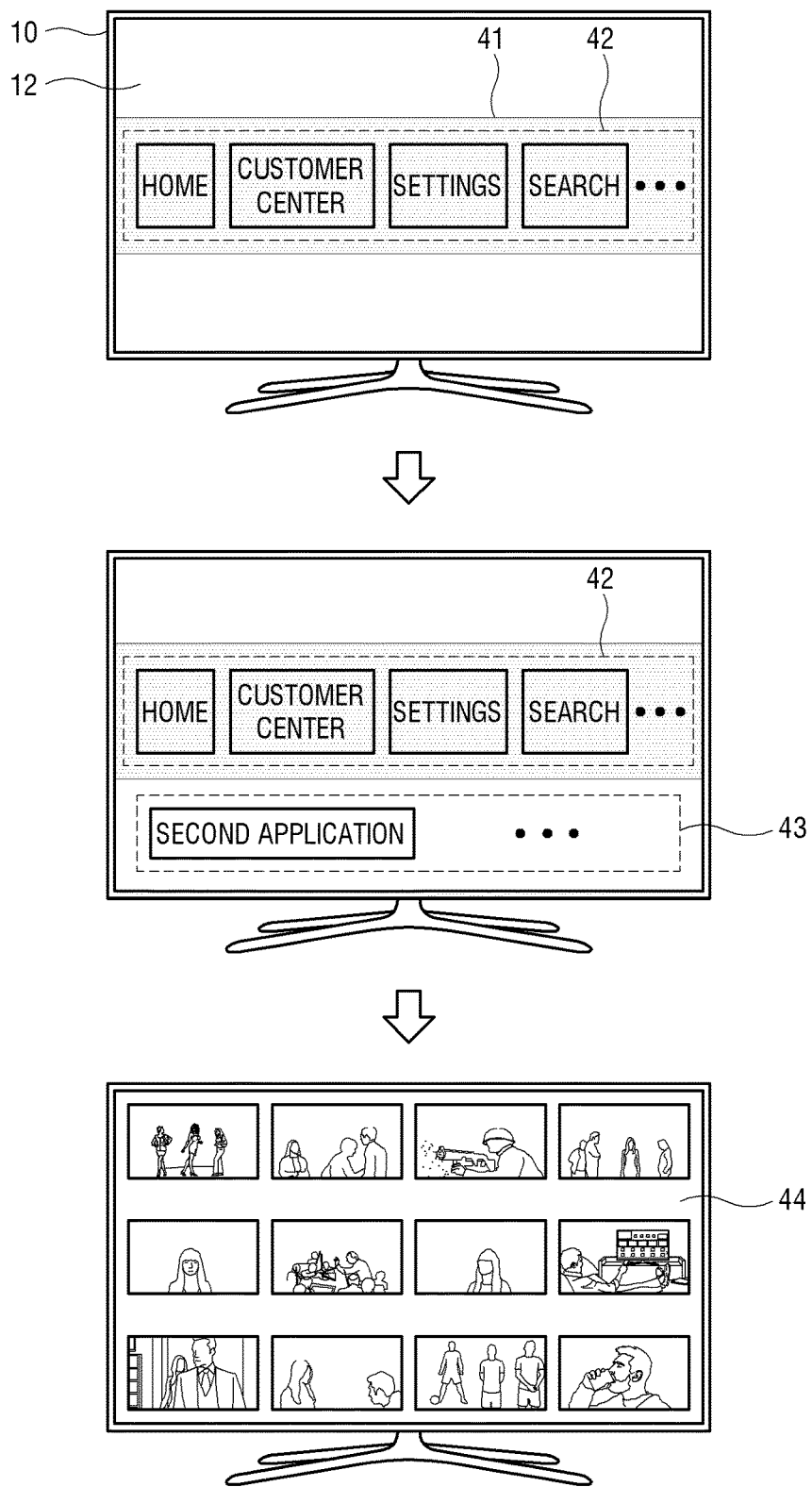
FIG. 4 illustrates an example in which a second application extends a function of a first application according to an embodiment of the disclosure.

FIG. 4 illustrates an example in which a second application extends a function of a first application.

As described above, the processor 4 executes the first application 1 based on the first code 3 of the first application 1 prepared before the execution of the first application 1, and controls the execution of the second application 2.

Below, it will be described by way of example with reference to FIG. 4 that the second application 2 extends the function of the first application 1 on the assumption that the first application 1 provides a function of displaying a home image 41 of a TV, which shows applications installed in the TV, and the second application 2 provides a function of providing a moving picture.

As shown in FIG. 4, the processor 4 receives an execution command for the first application 1. The execution command may be received from a user, but not limited thereto. Alternatively, the execution command may be generated in response to a specific event such as powering on the electronic apparatus 10.

When receiving the execution command, the processor 4 executes the first application 1 based on the previously prepared first code 3 of the first application 1, and displays the home image 41 of the TV on the display 12 as assumed above.

The processor 4 displays an item 43 of providing a moving picture corresponding to the function of the second application 2 on the TV home image 41, based on the code related to the execution of the second application 2 included in the first code 3 of the first application 1. The code related to the execution of the second application 2 includes the result code 33 or the code 34 compiled for the result code 33, as described above with reference to FIG. 3.

When the moving-picture providing item 43 is selected, the second application 2 corresponding to the moving-picture providing item 43 may be executed. The processor 4 displays a moving-picture providing image 44 corresponding to the function of the second application 2 according to the execution of the second application 2.

In this way, the second application 2 provides the moving-picture providing function in addition to the function of the first application 1 of displaying the TV home image 41, as the plug-in application of the first application 1, thereby extending the function of the first application 1.

When a third application different from the second application 2 is newly installed as the plug-in application, an item corresponding to the function of the third application is displayed on the TV home image 41 based on the code related to the execution of the third application included in the first code 3 of the first application 1, as described above.

When an item corresponding to the function of the third application is selected, the third application is executed so that the function of the third application can be performed. Thus, the third application also extends the function of the first application 1 as the plug-in application of the first application 1.

The processor 4 may be designed to display an item 42 corresponding to a function of a default application based on a code related to the execution of the default application included in the first code 3 of the first application 1. The default application includes an application designated for the first application 1 unlike the plug-in application. For example, the function of the default application corresponds home, customer center, settings, search, etc. When a user selects an item of "settings", the default application corresponding to the "settings" may be executed.

In this way, the processor 4 improves the execution speed of the first application 1 by using the first code prepared before executing the first application 1. For example, it is possible to significantly reduce time from when the TV home image 41 corresponding to the function of the first application 1 is displayed to when the item 43 corresponding to the function of the second application 2.

Figure 5:
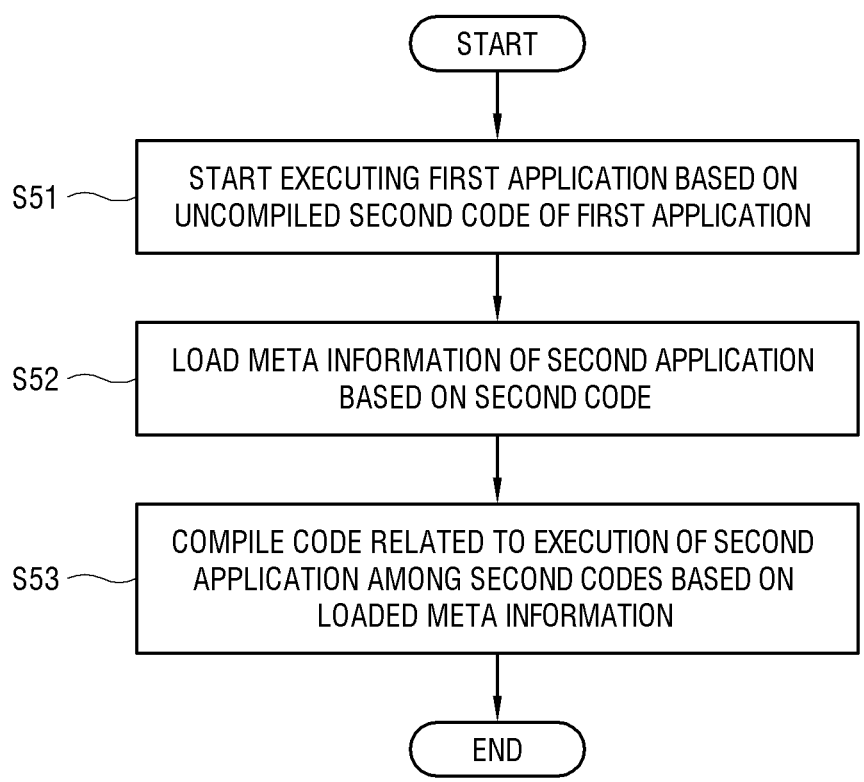
FIG. 5 illustrates an example in which a first code of a first application is prepared in connection with FIGS. 2 and 3 according to an embodiment of the disclosure.

FIG. 5 illustrates an example in which a first code of a first application is prepared in connection with FIGS. 2 and 3.

Below, a process of preparing the first code 3 of the first application 1 will be described with reference to FIG. 5. However, as described above with reference to FIG. 3, all or some of the foregoing operations may alternatively be performed by the server processor 5.

The processor 4 starts executing the first application 1 based on the uncompiled second code 31 of the first application 1 (S51). The second code 31 of the first application 1 refers to program sentences written by a programmer to execute the first application 1. The first code 3 is a target code after compilation, but the second code 31 is a source code before compilation. However, the second code 31 may be designed to include a target code previously, primarily, or intermediately compiled but not completely compiled yet.

The processor 4 loads the meta information of the second application 2 based on the second code 31 of the first application 1 (S52). The meta information of the second application 2 refers to information for functionally connecting the first application 1 and the second application 2, and includes the class type, method, characteristics, etc. corresponding to the second application 2. By loading the meta information, the second application 2 may be set or added as the plug-in application to the first application 1.

The second code 31 includes a code for loading the meta information of the second application 2 during the execution of the first application 1. Such a code is referred to as the dynamic code 32, and for example includes a code based on runtime such as reflection.

The processor 4 obtains the first code 3 of the first application 1 by compiling the second code 31 of the first application 1 based on the loaded meta information (S53).

The processor 4 changes the dynamic code 32 among the foregoing second codes 31 of the first application 1 based on the result code 33. The result code 33 includes the code related to the execution of the second application 2, as the code corresponding to the result of loading the meta information according to the dynamic code 32. For example, the processor 4 replaces the dynamic code 32 included in the second code 31 of the first application 1 with the result code 33. The processor 4 prepares the first code 3 of the first application 1, as the result of compiling the second code 31 of the first application 1 including the result code 33.

The foregoing operations may be directly performed by the electronic apparatus 10, but not limited thereto. Alternatively, the foregoing operations may be performed before manufacturing the electronic apparatus 10. In this case, the obtained first code 3 of the first application 1 may be previously stored in the storage 16 in the form of an installation file when the electronic apparatus 10 is manufactured.

When the third application, i.e., the plug-in application different from the second application 2 is installed while the second apparatus 10 is in use, the processor 4 loads the meta information of the third application based on the second code 31 of the first application 1 like the foregoing operations S51 to S53. The meta information of the third application refers to information for functionally connecting the first application 1 and the third application, and includes the class type, method, characteristics, etc. corresponding to the third application. By loading the meta information, the third application may be set or added as the plug-in application to the first application 1.

The processor 4 compiles the second code 31 of the first application 1 based on the result code 33 corresponding to the result of loading the meta information of the third application. For example, the processor 4 replaces the dynamic code 32 included in the second code 31 of the first application 1 with the result code 33, and prepares the first code 3 of the first application 1 as the result of compiling the second code 31 of the first application 1 including the result code 32.

In this way, the processor 4 improves the execution speed of the first application 1 by using the first code 3 of the first application 1 prepared before executing the first application 1.

Figure 6:
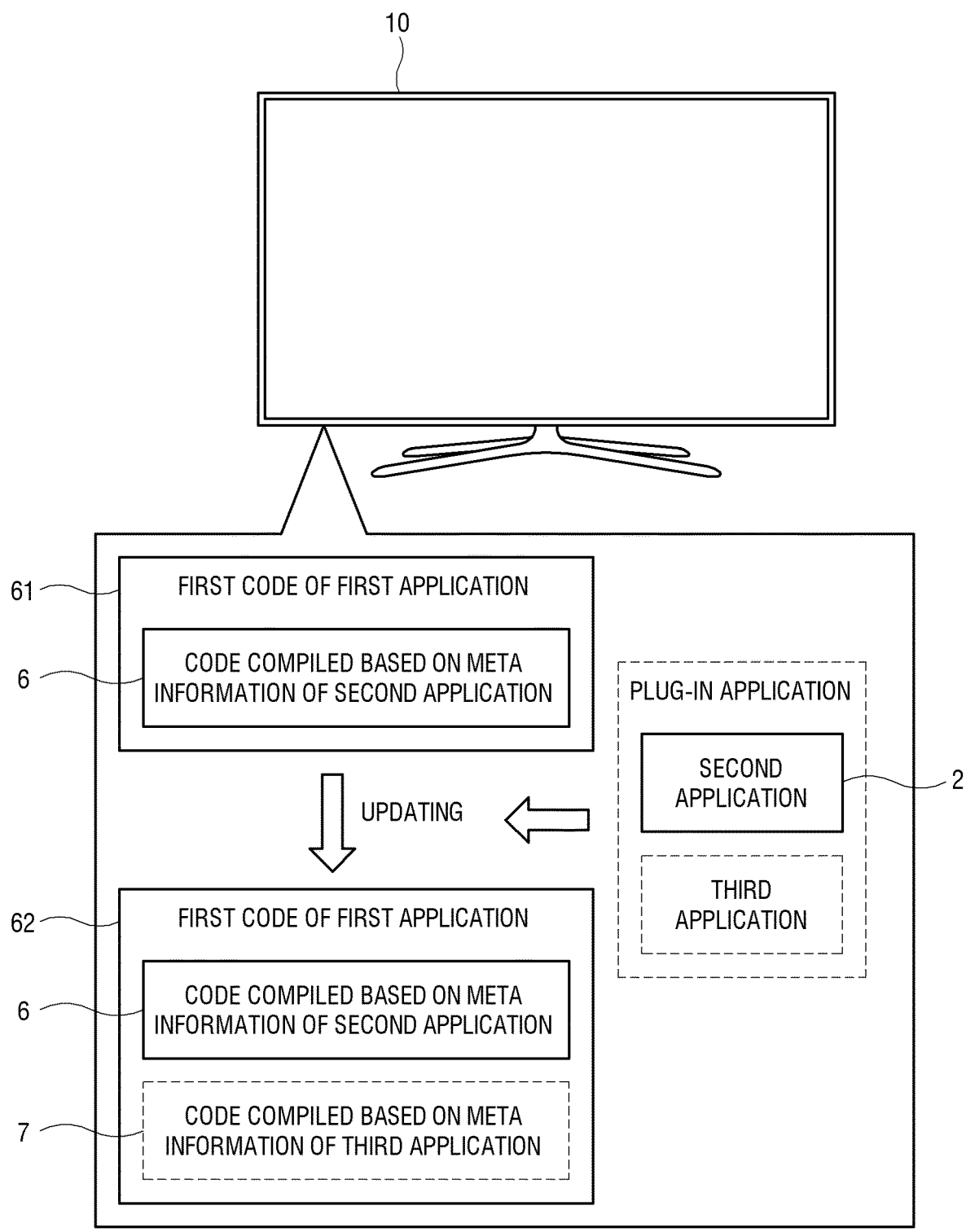
FIG. 6 illustrates an example in which a first code of a first application is generated according to an embodiment of the disclosure.

FIG. 6 illustrates an example in which a first code of a first application is generated.

Referring back to FIG. 1, it has been described that the first code 3 of the first application 1 includes the code 6 compiled based on the meta information of the second application 2, and the second application 2 is the plug-in application that has already been installed in the electronic apparatus 10.

Below, it will be described that an existing first code 61 is updated with a new first code 62 when the third application, i.e., the plug-in application different from the second application 2 is newly installed in the electronic apparatus 10, on the assumption that the first code 3 of the first application described with reference to FIG. 1 is the existing first code 61.

When the third application is installed in the electronic apparatus 10, the processor 4 obtains information about the dynamic code 32 for loading the meta information of the third application among the second codes 31 of the first application 1.

The processor 4 loads the meta information of the third application according to the dynamic code 32 based on the obtained information about the dynamic code 32. The meta information of the third application refers to information for functionally connecting the first application 1 and the third application, and includes the class type, method, characteristics, etc. corresponding to the third application. By loading the meta information, the third application may be set or added as the plug-in application to the first application 1.

The processor 4 obtains the result code 33 corresponding to the loaded meta information of the third application. The result code 33 includes a code corresponding to a result of loading the meta information of the third application according to the identified dynamic code 32.

The processor 4 changes the dynamic code 32 for the third application among the second codes 31 of the first application 1 based on the obtained result code 33. For example, the processor 4 replaces the dynamic code 32 for the third application, which is included in the second code 31 of the first application 1, with the obtained result code 33.

The processor 4 compiles the second code 31 of the first application 1, in which the result code 33 is included, thereby preparing the new first code 62 of the first application 1 through the compilation.

The processor 4 updates the exiting first code 61 with the new first code 62. The new first code 62 may include not only the code 6 compiled based on the meta information of the already installed second application 2, but also a code 7 compiled based on the meta information of the newly installed third application.

The processor 4 executes the first application 1 based on the updated first code 62, and uses the functions of the plug-in applications, i.e., the second application 2 and the third application based on the code corresponding to the meta information of the second application 2 and the code 7 corresponding to the meta information of the third application which are included in the first code 62 during the execution of the first application 1.

In this way, the processor 4 further improves the execution speed of the first application 1 by updating the first code 62 of the first application 1 before executing the first application 1 and using the updated first code 62 even though the plug-in application is newly installed.

Figure 7:
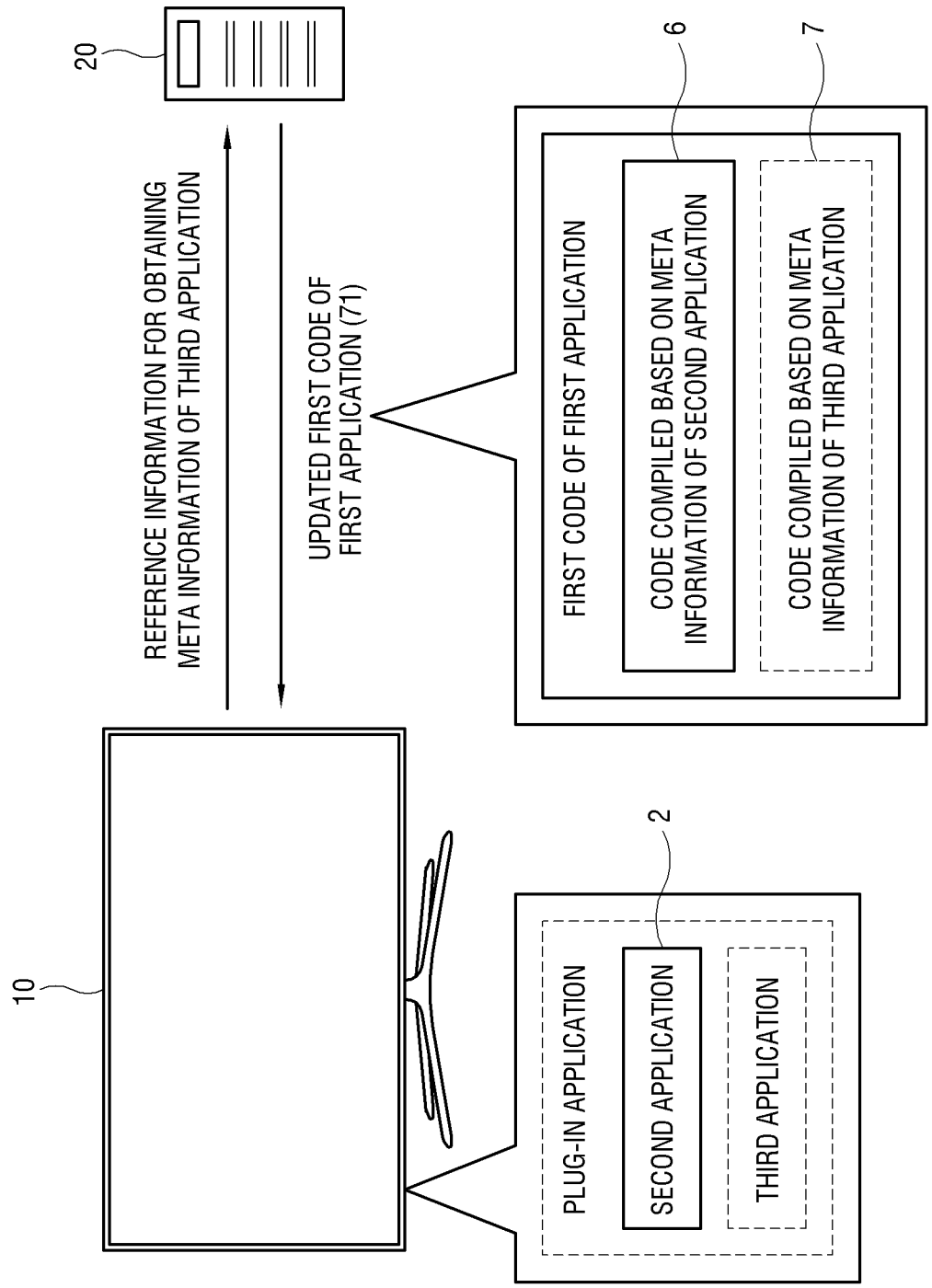
FIG. 7 illustrates an example in which an updated first code of a first application is received from a server in connection with FIG. 6 according to an embodiment of the disclosure.

FIG. 7 illustrates an example in which an updated first code of a first application is received from a sever in connection with FIG. 6.

It has been described above by way of example with reference to FIG. 6 that the processor 4 updates the first code 62 of the first application 1, but it will be described below by way of example that the updated first code 71 is received from the server 20.

When the third application is installed, the processor obtains information about the dynamic code 32 for loading the meta information of the third application, included in the second code 31 of the first application 1, and transmits the obtained information as reference information to the server 20.

The server processor 5 of the server 20 identifies the dynamic code 32 among the second codes 31 of the first application 1 based on the received reference information. The second code 31 of the first application 1 may be previously stored in the server 20.

The server processor 5 obtains the result code 33 corresponding to the identified dynamic code 32. The server processor 5 changes the dynamic code 32 among the second codes 31 of the first application 1 based on the obtained result code 33. For example, the dynamic code 32 is replaced with the result code 33.

The server processor 5 compiles the second code 31 of the first application 1, which includes the result code 33, thereby preparing a new first code 71.

The server processor 5 updates the existing first code 61 with the new first code 71. The existing first code 61 may be previously stored in the server 20. While the existing first code 61 includes the code 6 compiled based on the meta information of the already installed second application 2, the new first code 71 may include not only the code 6 compiled based on the meta information of the second application 2 but also the code 7 compiled based on the meta information of the installed third application.

The server processor 5 transmits the updated first code 71 to the electronic apparatus 10, so that the updated first code 71 can be stored as an installation file in the electronic apparatus 10.

The processor 4 executes the first application 1 based on the first code 71, thereby using the functions of the plug-in applications, i.e., the second application 2 and the third application, based on the code 6 corresponding to the meta information of the second application 2 and the code 7 corresponding to the meta information of the third application, which are included in the first code 71 of the first application 1.

In this way, the processor 4 receives and uses the first code 71 updated before executing the first application 1 from the server 20 even though the plug-in application is newly installed, thereby not only further improving the execution speed of the first application 1 but also more efficiently managing the resources.

Figure 8:
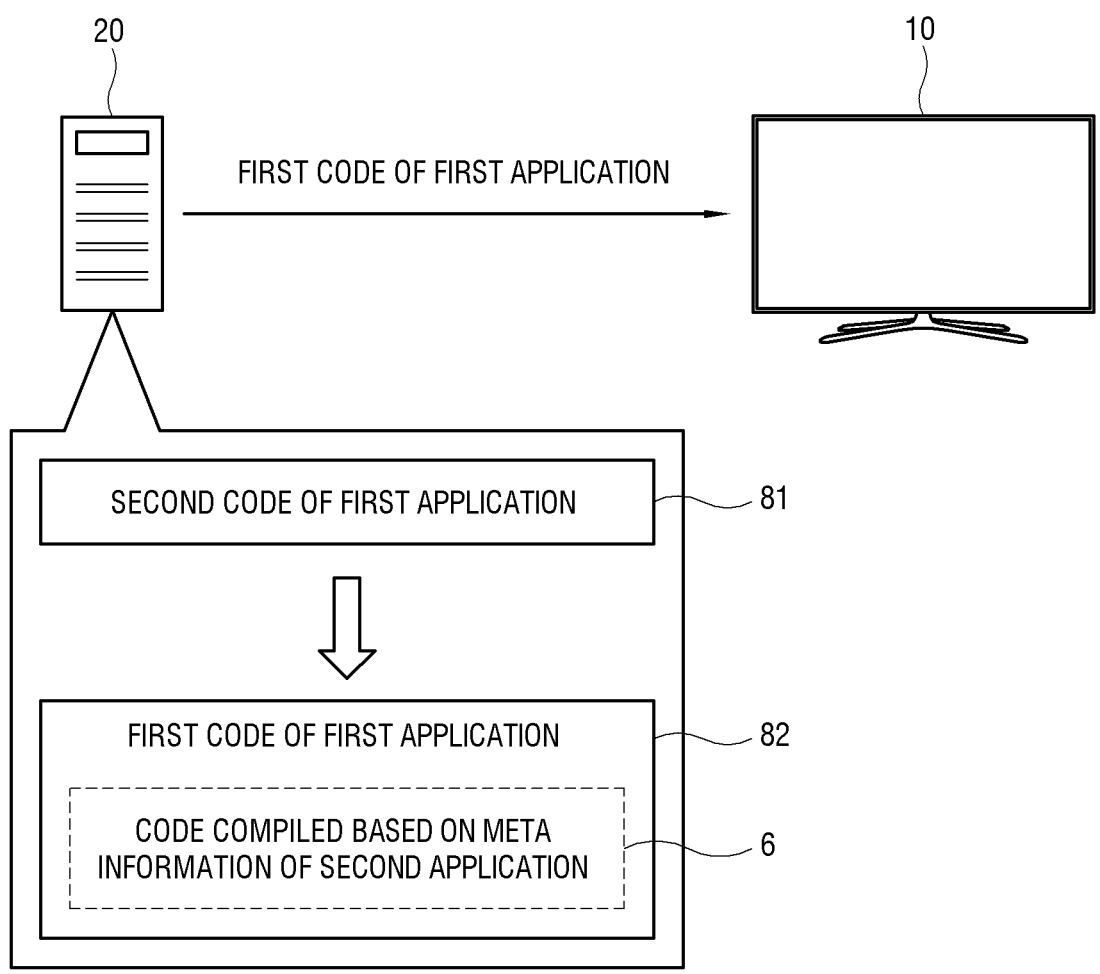
FIG. 8 illustrates an example in which a first code of a first application is prepared by a server of FIG. 2 according to an embodiment of the disclosure.

FIG. 8 illustrates an example in which a first code of a first application is prepared by a server of FIG. 2.

It has been described above by way of example with reference to FIG. 1 that the processor 4 of the electronic apparatus 10 prepares the first code 3 of the first application 1 corresponding to the second application 2 installed in the electronic apparatus 10, but it will be described below by way of example that the server processor 5 of the server 20 prepares a first code 82 of the first application 1 corresponding to the second application 2 installed in the electronic apparatus 10.

The server processor 5 of the server 20 identifies the dynamic code 32 for loading the meta information of the second application 2 among second codes 81 of the first application 1. The second codes 81 of the first application 1 may be previously stored as a source code in the server 20. The second codes 81 include a previously or primarily compiled code. The server processor 5 receives information about the dynamic code 32 from the electronic apparatus 10 in order to identify the dynamic code 32.

The server processor 5 obtains the result code 33 corresponding to the identified dynamic code 32. The result code 33 includes a code corresponding to a result of loading the meta information of the second application 2 according to the identified dynamic code 32.

The server processor 5 changes the dynamic code 31 among the second codes 81 of the first application 1 based on the obtained result code 33. For example, the server processor 5 replaces the dynamic code 32 with the result code 33.

The server processor 5 compiles the second code 81 of the first application 1 including the result code 33, thereby preparing a new first code 82. The newly prepared first code 82 may include the code 6 compiled based on the meta information of the second application 2.

The server processor 5 transmits the newly prepared first code 82 of the first application 1 to the electronic apparatus 10. The processor 4 of the electronic apparatus 10 executes the first application 1 based on the first code 82 of the first application 1 received from the server 20, and controls the execution of the second application 2 based on the code 6 corresponding to the second application among the first codes 82 of the first application 1.

In this way, the server processor 5 of the server 20 provides the first code 82, prepared based on the meta information of the second application 2 before executing the first application 1 in the electronic apparatus 10, to the electronic apparatus 10, thereby allowing the electronic apparatus 10 to improve the execution speed of the first application 1.

Figure 9:
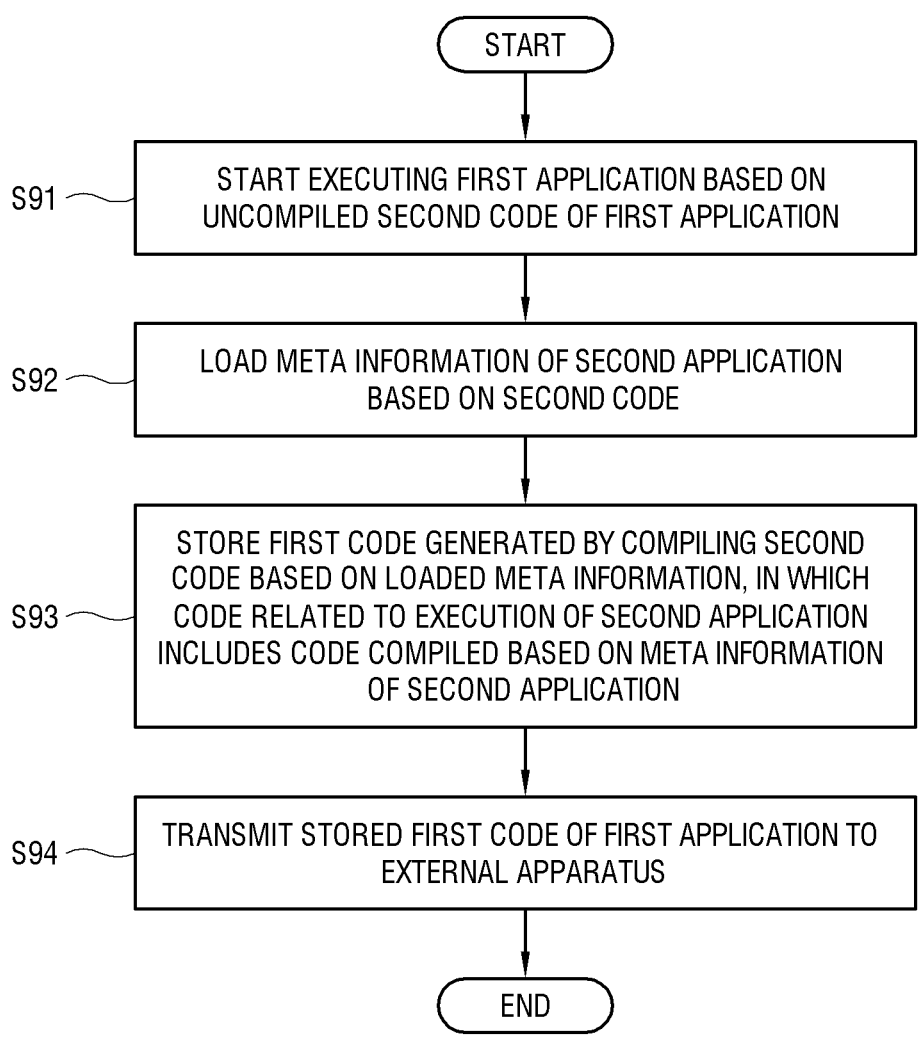
FIG. 9 illustrates an example showing a method of controlling the server of FIG. 8 according to an embodiment of the disclosure.

FIG. 9 illustrates an example showing a method of controlling the server of FIG. 8.

As shown in FIG. 9, the server processor 5 of the server 20 starts executing the first application 1 based on the second code 81 of the first application (S91). The second code 81 of the first application 1 includes an uncompiled source code or a compiled target code.

The server processor 5 loads the meta information of the second application 2 based on the second code 81 (S92). The meta information of the second application 2 refers to information for functionally connecting the first application 1 and the second application 2, and includes the class type, method, characteristics, etc. corresponding to the second application 2. The second code 81 includes the dynamic code 32 for loading the meta information of the second application 2 during the execution of the first application 1.

The server processor 5 generates the first code of the first application 1 by compiling the second code 81 based on the loaded meta information (S93). For example, the server processor 5 compiles the second code 81 of the first application 1 based on the result code 33 corresponding to the meta information of the second application 2. The result code 33 refers to a code corresponding to a result of loading the meta information of the second application 2. Among the second codes 81 of the first application 1, the dynamic code 32 may be changed based on the result code 33. The processor 4 generates the first code of the first application 1 as a result of compilation based on the result code 33.

The server processor 5 transmits the first code 82 of the first application to the external apparatus, in other words, the electronic apparatus 10 (S94). The processor 4 of the electronic apparatus 10 controls the execution of the second application 2 based on the code related to the execution of the second application 2, in other words, the code 6 corresponding to the meta information of the second application 2 among the first codes 82 of the first application 1, thereby using the function of the second application 2.

In this way, the server processor 5 provides the first code 82, which is prepared based on the meta information of the second application 2 before executing the first application 1 in the electronic apparatus 10, to the electronic apparatus 10, thereby allowing the electronic apparatus 10 to improve the execution speed of the first application 1.

Figure 10:
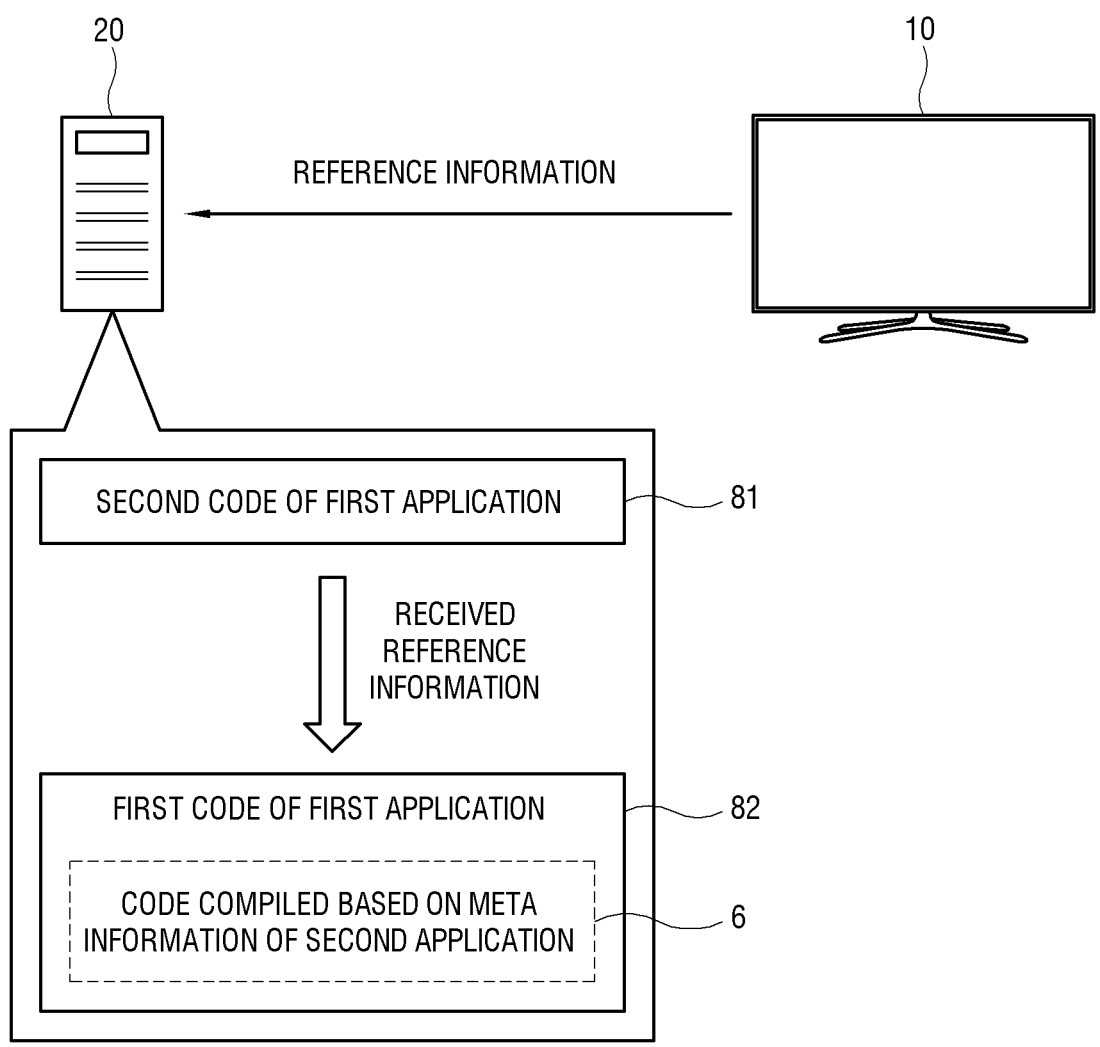
FIG. 10 illustrates an example in which reference information is utilized in connection with operation S92 of FIG. 9 according to an embodiment of the disclosure.

FIG. 10 illustrates an example in which reference information is utilized in connection with the operation S92 of FIG. 9.

As described above with reference to FIG. 8, the server processor 5 of the server 20 identifies the dynamic code 32 for loading the meta information of the second application 2 among the second codes 81 of the first application 1, thereby obtaining the result code 33 corresponding to the identified dynamic code 32.

In terms of identifying the dynamic code 32, the server processor 5 utilizes reference information received from the electronic apparatus 10. As information about the dynamic code 32, the reference information includes not only information about the dynamic code 32 itself, but also the location of the dynamic code 32 among the second codes 81 of the first application 1, information about a location of a selection where the dynamic code 32 is used, information about a call tree, etc.

The server processor 5 loads the meta information of the second application 2 according to the dynamic code 32 identified based on the reference information, and obtains the result code 33 corresponding to the result of loading the meta information.

The server processor 5 changes the dynamic code 32 among the second codes 81 of the first application 1 based on the obtained result code 33. For example, the server processor 5 replaces the dynamic code 32 with the result code 33.

The server processor 5 compiles the second code 81 of the first application 1 including the result code 33, thereby preparing a new first code 82. The new first code 82 includes the code 6 compiled based on the meta information of the second application 2.

The server processor 5 transmits the prepared first code 82 of the first application 1 to the electronic apparatus 10. The processor 4 of the electronic apparatus 10 executes the first application 1 based on the first code 82 of the first application 1 received from the server 20, and controls the execution of the second application 2 based on the code related to the execution of the second application 2, in other words, the code 65 corresponding to the meta information of the second application 2 during the execution of the first application 1.

In this way, the server processor 5 of the server 20 identifies the dynamic code 32 based on the reference information received from the electronic apparatus 10, thereby more quickly preparing the first code 81 of the first application 1.

Figure 11:
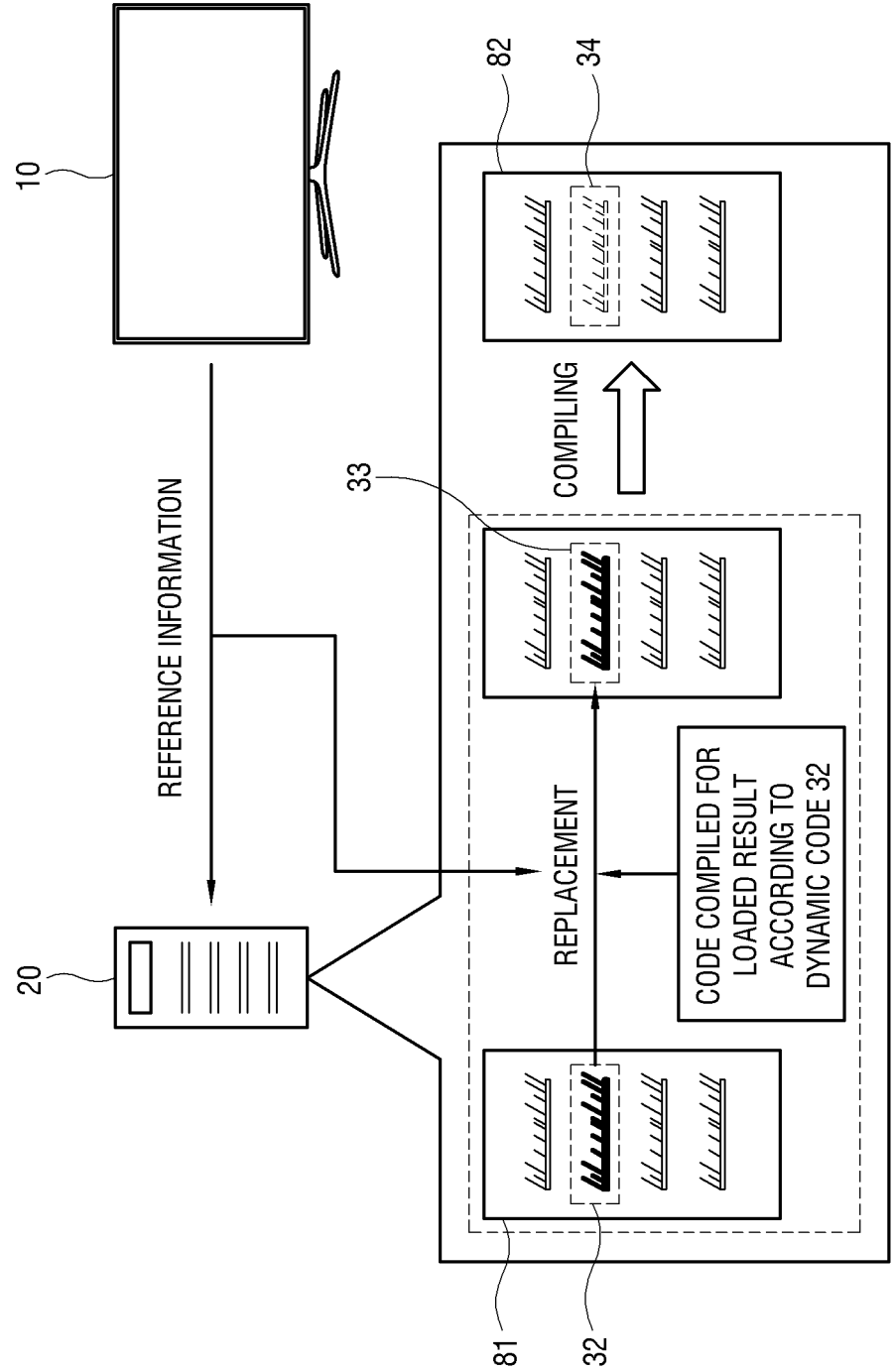
FIG. 11 illustrates another example in which the reference information is utilized in connection with operation S92 of FIG. 9 according to an embodiment of the disclosure.

FIG. 11 illustrates another example in which the reference information is utilized in connection with the operation S92 of FIG. 9.

As shown in FIG. 11, the server processor 5 identifies the dynamic code 32 among the second codes 81 of the first application 1 based on the reference information received from the electronic apparatus 10.

The server processor 5 loads the meta information of the second application 2 according to the identified dynamic code 32, and obtains the result code 33 corresponding to a result of loading the meta information. The result code 33 includes a code compiled for the result loaded according to the dynamic code 32.

The server processor 5 compiles the second code 81 of the first application 1 including the result code 33, thereby preparing a new first code 82.

In this way, the server processor 5 of the server 20 identifies the dynamic code 32 based on the reference information received from the electronic apparatus 10, thereby more quickly preparing the first code 82 of the first application 1.

Figure 12:
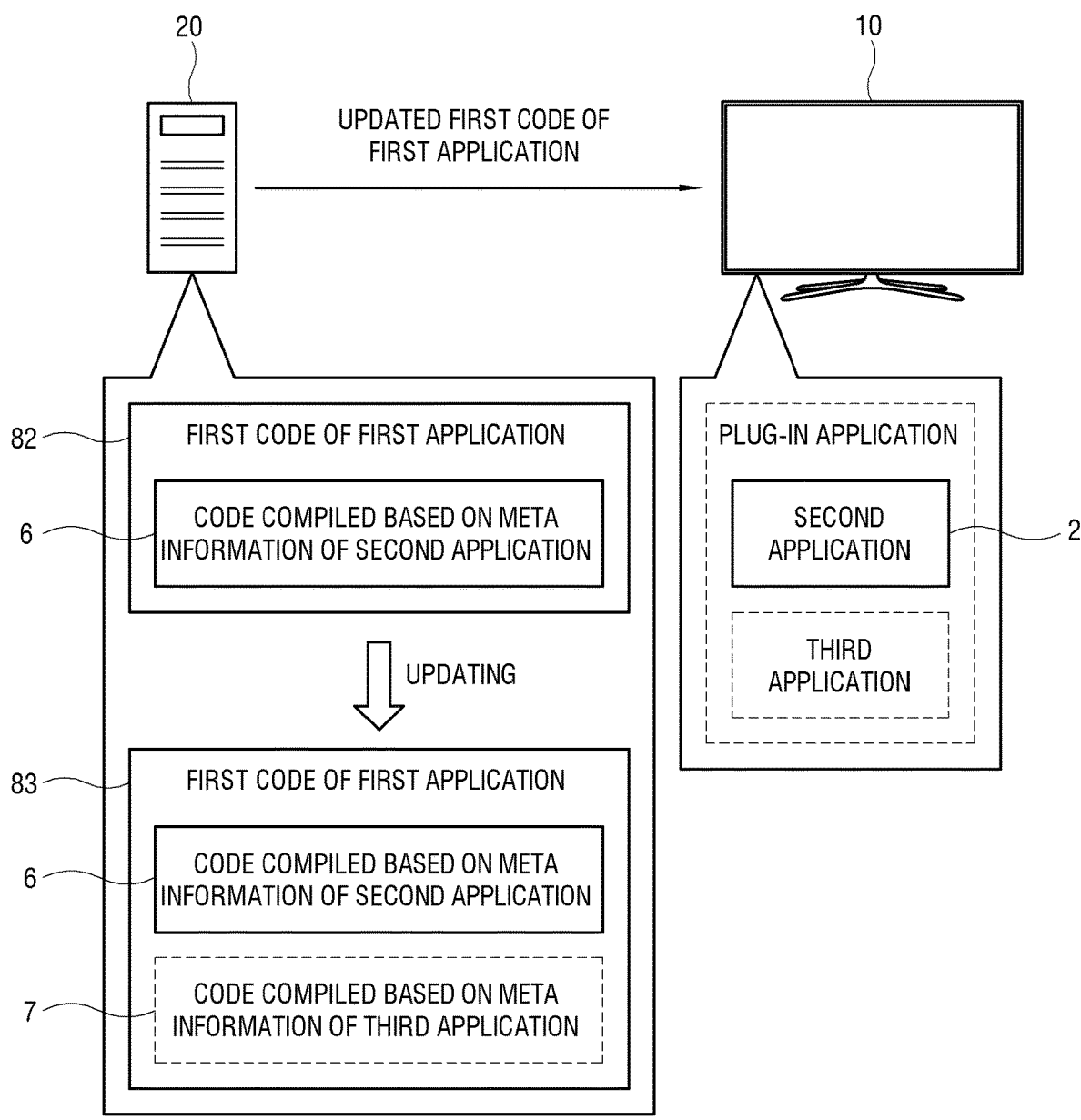
FIG. 12 illustrates an example of updating a first code of a first application in connection with operation S93 of FIG. 9 according to an embodiment of the disclosure.

FIG. 12 illustrates an example of updating a first code of a first application in connection with the operation S93 of FIG. 9.

It has been described above with reference to FIG. 8 that the first code 82 of the first application 1 includes the first code compiled based on the meta information of the second application 2, in which the second application 2 is the plug-in application that has already been installed in the electronic apparatus 10. Below, it will be described that an existing first code 82 is updated with a new first code 83 when the third application, i.e., the plug-in application different from the second application 2 is newly installed, on the assumption that the first code 82 of the first application 1 described with reference to FIG. 8 is the exiting first code 82.

When the third application is installed in the electronic apparatus 10, the server processor 5 receives information about the dynamic code 32 for loading the meta information of the third application from the electronic apparatus 10.

The server processor 5 identifies the dynamic code 32 among the second codes 81 of the first application 1 by utilizing the obtained information as the reference information. The meta information of the third application refers to information for functionally connecting the first application 1 and the third application, and includes the class type, method, characteristics, etc. corresponding to the third application. By loading the meta information, the third application may be set or added as the plug-in application to the first application 1. The server processor 5 obtains the result code 33 corresponding to the identified dynamic code 32. The result code 33 includes a code corresponding to the result of loading the meta information of the third application according to the identified dynamic code 32.

The server processor 5 changes the dynamic code 32 among the second codes 81 of the first application 1 based on the obtained result code 33. For example, the dynamic code is replaced with the result code.

The server processor 5 compiles the second code 81 of the first application 1 including the result code 33, thereby preparing a new first code 83. The server processor 5 updates the existing first code 82 with the new first code 83. The existing first code 82 may be previously stored in the server 20. While the existing first code 82 includes the code 6 compiled based on the meta information of the already installed second application 2, the new first code 83 may include not only the code 6 compiled based on the meta information of the second application 2 but also the code 7 compiled based on the meta information of the newly installed third application.

The server processor 5 transmits the updated first code 83 to the electronic apparatus 10, and the processor 4 executes the first application 1 based on the first code 83 received from the server 20, thereby using the functions of the plug-in applications, i.e., the second application 2 and the third application, based on the codes related to the execution of the second application 2 and the third application, i.e., the code 6 corresponding to the meta information of the second application 2 and the code 7 corresponding to the meta information of the third application, which are included in the first code 3 of the first application 1.

In this way, the server processor 5 provides the first code 83 updated before executing the first application 1 to the electronic apparatus 10 even through the plug-in application is newly installed in the electronic apparatus 10, thereby allowing the electronic apparatus 10 to not only further improve the execution speed of the first application 1 but also more efficiently manage resources.

Various embodiments of the disclosure are achieved by software including one or more commands stored in a storage medium readable by the electronic apparatus 10 and the like (machine). For example, the processor 4 of the electronic apparatus 10 calls and executes at least one command among one or more stored commands from the storage medium. This enables the electronic apparatus 10 and the like apparatus to operate and perform at least one function based on the at least one called command. The one or more commands include a code produced by a compiler or a code executable by an interpreter. The machine-readable storage medium may be provided in the form of a non-transitory storage medium. Here, the 'non-transitory' merely means that the storage medium is a tangible device and does not include a signal (for example, an electromagnetic wave) and this term does not distinguish between cases of being semi-permanently and temporarily stored in the storage medium. For instance, the 'non-transitory storage medium' may include a buffer in which data is temporarily stored.

For example, methods according to various embodiments of the disclosure may be provided as involved in a computer program product. The computer program product according to the disclosure includes instructions of software to be executed by the processor as mentioned above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least part of the computer program product (e.g., a downloadable app) may be transitorily stored or temporarily produced in a machine-readable storage medium such as a memory of a manufacturer server, an application-store server, or a relay server.

The disclosure has been described in detail through exemplary embodiments, but the disclosure is not limited to these embodiments and may be implemented in various ways without departing from the scope of appended claims.

What is claimed is:

1. An electronic apparatus comprising:
a display;
a first storage;
a second storage; and
a processor configured to:
control the first storage to store codes of a first application including codes for setting a second application as a plug-in application of the first application that are compiled before a request to execute the first application is received,
based on the request to execute the first application being received, execute the codes of the first application and the complied codes for setting the second application as the plug-in application of the first application, and
control the display to display a first menu item of the first application and a second menu item of the second application,
wherein the processor is configured to:
based on the request to execute the first application being received, load the codes of the first application into the second storage,
display the second menu item of the second application on the display by executing the codes of the first application loaded into the second storage, and
execute the second application based on the second menu item selected by a user's input.

2. An electronic apparatus comprising:
a display;
a storage; and
a processor configured to:
control the storage to store codes of a first application including codes for setting a second application as a plug-in application of the first application that are compiled before a request to execute the first application is received,
based on the request to execute the first application being received, execute the codes of the first application and the complied codes for setting the second application as the plug-in application of the first application, and
control the display to display a first menu item of the first application and a second menu item of the second application,
wherein compiled codes of the first application comprises first codes, and
wherein the processor is configured to:
start the execution of the first application based on second codes of the first application which are uncompiled;
load meta information of the second application based on the second codes;
compile the codes for setting the second application as the plug-in application of the first application among the second codes based on the loaded meta information; and
obtain the first codes by compiling the second codes comprising the compiled codes for setting the second application as the plug-in application of the first application.

3. An electronic apparatus comprising:
a display;
a storage; and
a processor configured to:
control the storage to store codes of a first application including codes for setting a second application as a plug-in application of the first application that are compiled before a request to execute the first application is received, based on the request to execute the first application being received, execute the codes of the first application and the complied codes for setting the second application as the plug-in application of the first application, and control the display to display a first menu item of the first application and a second menu item of the second application, wherein the processor is configured to:

add a third application different from the second application as a new application so that execution of the third application is controllable during the execution of the first application; and update the codes of the first application based on meta information of the added third application.

4. The electronic apparatus of claim 3, further comprising an interface, wherein the processor is configured to control the interface so that reference information to obtain the meta information of the third application is transmittable to a server.

5. The electronic apparatus of claim 4, wherein the processor is configured to receive the codes of the first application updated based on the meta information of the third application from the server.

6. An electronic apparatus comprising:

a connector configured to connect with an external apparatus; and a processor configured to:

start executing a first application based on first codes of the first application, the first codes being uncompiled, load meta information of a second application based on the first codes, store second codes of the first application, the second codes being obtained by compiling codes for setting the second application as a plug-in application of the first application based on the loaded meta information, and control the stored second codes of the first application to be transmitted to the external apparatus that is connected to the electronic apparatus through the connector, wherein, based on a request for execution of the first application being received, the second codes of the first application, which are transmitted to the external apparatus, enable execution of the second codes of the first application and the compiled codes for setting the second application as the plug-in application of the first application by the external apparatus so that a first menu item of the first application and a second menu item of the second application are displayed.

7. The electronic apparatus of claim 6, wherein the processor is configured to:

receive reference information about the meta information of the second application from the external apparatus, and load the meta information of the second application based on the received reference information.

8. The electronic apparatus of claim 6, wherein the processor is configured to:

identify a code for loading the meta information of the second application, the code for loading being identified as being included in the first codes, or a section of a corresponding code among the first codes, based on the reference information, and replace the identified code or the identified section with a compiled code or a code section, based on the meta information of the second application.

9. The electronic apparatus of claim 6, wherein the processor is configured to:

update the second code of the first application based on meta information of a third application so that execution of the third application is controllable and the third application is added as a new application during the execution of the first application; and control the connector to transmit the updated second code of the first application to the external apparatus.

* * * * *